United States Patent
Kerwin

[15] 3,647,457

[45] Mar. 7, 1972

[54] TECHNIQUE FOR RECORDING AND TESTING THE REGISTRATION OF SEQUENTIAL MASK SETS

[72] Inventor: Robert E. Kerwin, Westfield, N.J.

[73] Assignee: Bell Telephone Laboratories, Incorporated, Murray Hill, N.J.

[22] Filed: Oct. 13, 1969

[21] Appl. No.: 865,971

[52] U.S. Cl. ....................96/41, 96/36.2, 96/49, 96/90 R

[51] Int. Cl. ....................G03c 5/04, G03c 7/26

[58] Field of Search ....................96/41, 36.2, 90 R, 49

[56] References Cited

UNITED STATES PATENTS

| | | | |
|---|---|---|---|
| 3,555,172 | 1/1971 | Heinz | 96/36.2 X |
| 3,383,212 | 5/1968 | MacLachlan | 96/90 X |
| 3,390,995 | 7/1968 | Manos | 96/90 X |
| 3,506,442 | 4/1970 | Kerwin | 96/41 |
| 3,511,658 | 5/1970 | Manko et al. | 96/41 |

*Primary Examiner*—Harold Ansher
*Attorney*—R. J. Guenther and Edwin B. Cave

[57] ABSTRACT

A technique for recording the registration of a sequence of photomasks involves coating a reflective substrate with a photosensitive film and exposing the substrate to light through the first of the sequence of masks until a visible image is obtained. The next mask in the set is then aligned and the procedure repeated.

7 Claims, No Drawings

TECHNIQUE FOR RECORDING AND TESTING THE REGISTRATION OF SEQUENTIAL MASK SETS

BACKGROUND OF THE INVENTION

1. Field of the Invention

This invention relates to a technique for recording and testing the registration of a sequence of photomasks destined for use in the fabrication of integrated circuits. More particularly, the present invention relates to a reiterative technique for testing the registration of a sequence of photomasks by forming a plurality of visible images upon a substrate member which may be visually distinguished on the basis of tone.

2. Description of the Prior Art

In the fabrication of integrated circuits, it is conventional to employ a plurality of sequential registered photolithographic operations utilizing a series of photomasks, each of which is prepared independently. Registration of the members of the mask set is critical since misalignment of the elements of a device or the components of a circuit prepared in accordance with such techniques will lead to device failure. The prior art procedure for testing mask registration involves overlaying the successive masks and checking their registration microscopically. Unfortunately, this procedure fails to provide a permanent registration record and is seriously limited by depth of focus limitations of the microscope employed. A more accurate prior art technique for attaining this end involves fabrication of a complete device and subsequent microscopic examination thereof, an expensive and time-consuming operation.

Recently, a technique for obviating these limitation was described by R. E. Kerwin in copending application, Ser. No. 763,348, filed Sept. 27, 1968 now U.S. Pat. No. 3,506,442. The technique described therein involves a series of processing steps which avail themselves of certain characteristics inherent in the physical development process. Briefly, this technique involves successively sensitizing, exposing and physically developing a recording medium in a series of repetitive steps, exposure being effected in each successive step through the photomasks to be employed sequentially in the fabrication of an integrated circuit. Ultimately, the resultant product is examined microscopically to determine the registration of the superimposed masks.

SUMMARY OF THE INVENTION

In accordance with the present invention an alternative technique is described for obviating the prior art limitations alluded to above. The inventive technique involves coating a highly reflective suitable substrate member with a photosensitive film comprising an organic color generator and a photooxidant and exposing the substrate to a light source through the first of a series of photomasks for a time period sufficient to obtain a visible image of high contrast. Thereafter, the next mask in the sequential set is aligned and the exposure step repeated. This sequence of alignment and exposure steps is then repeated until all masks in the set have been recorded, at which juncture microscopic examination of the resultant substrate is made to determine the registration of the masks.

DETAILED DESCRIPTION

A general outline suitable for use in the practice of the present invention will now be given. Certain operating parameters and ranges are indicated.

The first step in the practice of the present invention involves selecting a suitable substrate, any highly reflective flat material being found suitable for this purpose. The term "-highly reflective" as employed herein may be defined as a material manifesting a reflectivity in excess of 50 percent. This has been found necessary in the practice of the invention due to the fact that the commercially available alignment tools employ incident radiation and, accordingly, in order to obtain a satisfactory level of contrast during the alignment and inspection stages a reflective surface is necessary. Materials found to be particularly useful for this purpose include highly polished silicon wafers, metallized surfaces, such as plated glass, etc.

Thereafter, the substrate chosen is coated with a thin film of a photosensitive material comprising a composition including an organic color generator and a photooxidant which when irradiated with a pattern of light of a wavelength within the range of 200 to 420 nanometers undergo a reaction to form a visible image corresponding to the pattern of light.

Many types of organic compounds function as organic color generators. These compounds may conveniently be categorized as colorless, nitrogen containing compounds which are capable of producing a color in a photooxidative process in the presence of a photooxidant. Compounds which are suitable as color generators are disclosed in U.S. Pat. Nos. 3,390,994 and 3,390,996. Materials found to be particularly useful for this purpose include aminotriarylmethanes, such as bis(2-chloro-4-diethylaminophenyl) (p-chlorophenyl) methane, tris(p-diethylaminophenyl) methane, tris(4-dimethylamino-o-tolyl) methane, aminoxanthenes, aminothioxanthenes, amino-9,10-dihydroacridines, aminophenoxazines, aminophenathiazenes, aminodihydrophenazines, aminodiphenylmethanes, cyanoethanes, leucoindigoid dyes, etc.

Similarly a wide variety of compositions are found acceptable as photooxidants in the practice of the present invention. These materials evidence a permanent color when mixed with an organic color generator and irradiated with a light source manifesting a wavelength within the range of 200 to 420 nanometers. Compounds suitable for this purpose are also described in the aforementioned U.S. patents and include biimidazoles, tetraarylhydrazines, tetraacylhydrazines, diacylaminobenzotriazoles, benzothiazole disulfides, etc. Compounds found particularly useful as photooxidants include 2,2'-bis(o-bromophenyl)-4,4',5,5'-tetraphenyl-biimidazole, and 2,2'-bis(o-chlorophenyl)-4,4',5,5'-tetra-phenyl-biimidazole.

The amount of color generator utilized determines the depth of color which will be obtained with a given photosensitive composition. Many color generators such as leuco, triarylmethane dyes, will require a molar equivalent of photooxidant for complete conversion to the colored form. Less than molar equivalents of photooxidants are operable but impractical. A suitable range of photooxidant to color generator ranges from about 1:10 to about 100:1.

The components of the photosensitive composition are typically dissolved in a suitable solvent, which is capable of wetting the substrate and inert thereto, for the purpose of providing a fluid medium for application to the substrate. Materials found useful for this purpose evidence boiling points of at least 60° C. at atmospheric pressure and include acetone, formamide, methanol, ethanol, propanol, polypropylene glycols, toluene, polyalkylene glycols of a low molecular weight, etc. A small residue of solvent in the dry composition is required to produce color and to form an image upon irradiation.

In addition to the residual amount of a solvent, a binder is typically present and serves to adhere the photosensitive composition to the substrate and to thicken the solution of the composition. Suitable binders include ethyl cellulose, polyvinyl alcohol, polystyrene, polyvinyl acetate, cellulose acetate, cellulose acetate butyrate, etc. The binder is employed in an amount ranging from 10 to 30 parts by weight per part of combined weight of organic color generator and photooxidant.

The photosensitive composition having been prepared, the substrate surface is then coated with a thin film thereof of a thickness within the range of 0.5 to 3 microns. It has been determined that the use of a film less than 0.5 microns in thickness fails to result in the generation of sufficient color, whereas film thickness greater than 3 microns result in the formation of undesirably diffuse images.

Thereafter, the coated substrate is exposed to a light source through the first mask in the sequential set to be recorded for a time period sufficient to obtain a visible image of high contrast, typically ranging in duration from 1 to 12 seconds. It has been determined that the inventive technique may be most advantageously practiced by varying the exposure period for each successive mask to be exposed so as to result in successive images on the substrate which may be visually distinguished on the basis of tone. Thus, for a typical mask set comprising 3 masks, it is convenient to expose the substrate for a duration ranging from 1 to 10 seconds with each succeeding mask being exposed for a shorter time period than its predecessor.

The wavelength of radiation which activates color formation will of course vary with the color generator and the photooxidant employed. However it will lie within the range of 200 to 420 nanometers. Suitable means for providing such radiation include ultraviolet lamps, incandescent lamps, sunlight, etc. Following the exposure, the next mask in the sequential set is aligned with the image of the first mask now appearing on the substrate by means of a conventional alignment tool and exposure again effected in accordance with the exposure schedule delineated above. The cycle of alignment and exposure is then repeated until the remaining masks of the sequential set have been recorded. At the conclusion of the operation registration is determined microscopically. An example of the application of the present invention is set forth. The example has been furnished for illustrative purposes only and it will be appreciated by those skilled in the art that it is not to be considered as limiting.

EXAMPLE

The substrate employed was a 2×2×0.060 inch glass plate bearing a 1,000 A. thick coating of chromium. A one micron coating of a photosensitive composition comprising 0.5 percent by weight tris(p-diethylaminophenyl) methane, 2 percent by weight of 2,2′-bis($\sigma$-chlorophenyl)-4,4′,5,5′-tetraphenyl biimidazole, 65 percent by weight of film-forming polymer, cellulose acetate butyrate, and 32.5 percent by weight of nonvolatile solvent, polypropylene glycol, was next applied to the substrate by spin coating and dried in air. Thereafter, the substrate bearing the photosensitive composition was exposed through the first of a set of four photomasks whose registration it was desired to test employing a mercury arc light source having a wavelength of 360 nanometers for 12 seconds, at which point a visible image of high contrast appeared. Following, the second mask in the set was aligned by means of an alignment tool and the substrate exposed for 8 seconds. The alignment and exposure procedure was repeated with each of the remaining masks with 3- and 1-second exposures successively and the registration of the mask set was determined at the conclusion of the operation by microscopic examination.

I claim:

1. A method for recording and testing the registration of a sequential mask set destined for use in the fabrication of an integrated circuit comprising the steps of (a) coating a highly reflective substrate with a photosensitive film comprising an organic color generator and a photooxidant, said coating having a thickness within the range of 0.5 to 3 microns, (b) exposing said substrate to light having a wavelength ranging from 200 to 420 nanometers through the first mask in said set until a visible image of high contrast is obtained in said film, (c) aligning the second mask in the said set with the image of said first mask, (d) repeating the exposure and alignment sequence of steps for each mask in said set, and (e) microscopically examining the resultant substrate to determine registration.

2. Method in accordance with claim 1 wherein said substrate is a chromium-coated glass.

3. Method in accordance with claim 1 wherein said organic color generator is an aminotriarylmethane.

4. Method in accordance with claim 3 wherein said aminotriarylmethane is tris(p-diethylaminophenyl) methane.

5. Method in accordance with claim 4 wherein said photooxidant is 2,2′-bis($\sigma$-chlorophenyl)-4,4′,5,5′-tetraphenyl biimidazole.

6. Method in accordance with claim 1 wherein said photooxidant is a biimidazole.

7. Method in accordance with claim 6 wherein said photooxidant is 2,2′-bis($\sigma$-chlorophenyl)-4,4′,5,5′-tetraphenyl biimidazole.

* * * * *